United States Patent [19]

Sano et al.

[11] Patent Number: 5,253,286
[45] Date of Patent: Oct. 12, 1993

[54] APPARATUS FOR FOCUSING IMAGE IN TELEVISION CAMERA FOR VIDEO TELEPHONE

[75] Inventors: Shoichi Sano; Syogo Nakamura, both of Kawasaki, Japan

[73] Assignee: Fujitsu Limited, Kawasaki, Japan

[21] Appl. No.: 839,903

[22] Filed: Feb. 21, 1992

[30] Foreign Application Priority Data

Mar. 8, 1991 [JP] Japan .................. 3-043814

[51] Int. Cl.⁵ .................. H04N 7/14; H04M 11/00
[52] U.S. Cl. .................. 379/53; 358/85; 358/224; 358/227; 379/96
[58] Field of Search ............... 379/53, 54, 96; 358/85, 358/227, 224, 93, 94

[56] References Cited

U.S. PATENT DOCUMENTS 4,873,576 10/1989 Hattori et al. .................. 358/224
4,888,795 12/1989 Ando et al. .................. 379/96

FOREIGN PATENT DOCUMENTS 0119488 5/1990 Japan .
4221944 8/1992 Japan .................. 358/224

*Primary Examiner*—Jin F. Ng
*Assistant Examiner*—Stella L. Woo

[57] ABSTRACT

The television camera of a video telephone set can easily be focused on the image of an object, such as a sheet of paper, through an inexpensive focusing apparatus. An indication corresponding to the size of the sheet is displayed on a display unit. The size of the displayed indication is determined depending on the distance, as detected by a zoomed distance detector, by which the lens of the television camera is zoomed. The position of the television camera is moved with respect to the object until the edges of the sheet are aligned with the indication displayed on the display screen of the display unit. When the edges of the sheet are aligned with the displayed indication, the television camera is sharply focused on the displayed image of the object. The size of the displayed indication, which indicates the actual size of the sheet, is determined based on an inputted sheet size and the detected distance by which the lens is zoomed. The television camera can thus be focused on the displayed image with ease.

20 Claims, 7 Drawing Sheets

APPARATUS FOR FOCUSING IMAGE IN TELEVISION CAMERA FOR VIDEO TELEPHONE

BACKGROUND OF THE INVENTION

1. Field of the Invention

The present invention relates to a method of and an apparatus for focusing an image in a television camera for video telephone, and more particularly to a method of and an apparatus for focusing an image, to be transmitted, in a television camera for video telephone through a simple process.

2. Description of the Prior Art

The recent development of the ISDN (integrated services digital network) allows information to be transmitted over a wide range of frequencies and also makes video telephone practically feasible. The video telephone system includes television cameras at terminals for imaging speakers and any documents or materials at hand so that the other parties can visually perceive them on CRT (cathode-ray tube) displays.

To image a document, for example, at hand, the user of the CRT display switches from a reception mode to a transmission mode, directs the television camera, detached from the video telephone set, to image the document that may be placed on a desk or the like, and focuses the displayed image by turning the lens barrel of the television camera white viewing the image on the CRT display.

It is cumbersome to turn the lens barrel with one hand in focusing the displayed image, and it is also difficult to tell exactly when the displayed image is sharply focused based on the visual check of the image on the CRT display.

To solve the above problems, it has been proposed to combine an automatic focusing mechanism with the television camera for automatically focusing the image. However, the added automatic focusing mechanism makes the entire television camera system quite complex. The television camera system with the automatic focusing mechanism is made up of a large number of parts, highly costly, and large in size. Some automatic focusing mechanisms require more time in getting images focused than manual focusing mechanisms.

SUMMARY OF THE INVENTION

It is an object of the present invention to provide a method of and an apparatus for easily focusing an image in a television camera for video telephone through an inexpensive mechanism.

Another object of the present invention is to provide a method of and an apparatus for focusing an image in a television camera for video telephone according to an improved focusing process.

According to the present invention, there is provided a method of focusing an image for a video telephone set having a television camera for imaging an object, the television camera being variable in distance up to the object, a display unit for displaying the image of the object imaged by the television camera, and zoomed distance detecting means for detecting the distance to which the lens of the television camera is zoomed, the method comprising the steps of (a) detecting the distance to which the lens of the television camera is zoomed, with the zoomed distance detecting means, (b) determining an indication corresponding to a predetermined portion of the object, based on the detected distance, (c) displaying the determined indication together with the image of the object imaged by the television camera on the display unit, and (d) transmitting the image of the object as a focused image to another video telephone set when the predetermined portion of the object is aligned with the indication on the display unit as a result of movement of the television camera with respect to the object.

According to the present invention, there is also provided a method of focusing an image for a video telephone set having a television camera for imaging an object, the television camera being variable in distance up to the object, a display unit for displaying the image of the object imaged by the television camera, zoomed distance detecting means for detecting the distance to which the lens of the television camera is zoomed, and an input device for inputting the size of the object, the method comprising the steps of (a) reading the distance to which the lens of the television camera is zoomed, from the zoomed distance detecting means, (b) reading the size of the object from the input device, (c) determining the size of an indication corresponding to a predetermined portion of the object, based on the read distance and the read size of the object, d displaying the determined indication together with the image of the object imaged by the television camera on the display unit, and (e) transmitting the image of the object as a focused image to another video telephone set when the predetermined portion of the object is aligned with the indication on the display unit as a result of movement of the television camera with respect to the object.

According to the present invention, there is further provided an apparatus for focusing an image for a video telephone set, comprising a television camera for imaging an object, the television camera having a lens, a display unit for displaying the image of the object imaged by the television camera, zooming means for varying the distance to which the lens of the television camera is zoomed, zoomed distance detecting means for detecting the distance to which the lens of the television camera is zoomed by the zooming means, control means for determining an indication corresponding to a predetermined portion of the object, based on the detected distance, and displaying the determined indication on the display unit, and transmitting means for transmitting the image of the object as a focused image to another video telephone set when the predetermined portion of the object is aligned with the indication on the display unit as a result of movement of the television camera with respect to the object.

Generally, the distance from the lens of the television camera to the object for focusing the imaged object is determined uniquely with respect to a certain zoomed distance of the lens. Once the distance from the lens to the object is determined, the size of the image of the object displayed on the display unit is determined. Therefore, if the zoomed distance of the lens and the size of the object are given, the size of the image of the object on the display unit at the time the image is sharply focused is determined. The present invention is based on the above principle of operation. More specifically, when the zoomed distance is of a certain value and the predetermined portion of the object is of a certain size, the display unit displays on its display screen an indication corresponding to an object size which will be indicated if the predetermined portion is displayed sharply in focus on the display unit. With the zoomed distance being kept at the certain value, the television camera is moved with respect to the object until the predetermined portion of the object is aligned with the displayed indication on the display screen, whereupon the image of the object produced by the television camera is sharply focused. Therefore, the image of the object can easily be focused on the display unit. The mechanism for focusing the displayed image of the object can be manufactured inexpensively.

The indication displayed on the display unit may be of any desired size to make the focusing operation more efficient and smooth.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
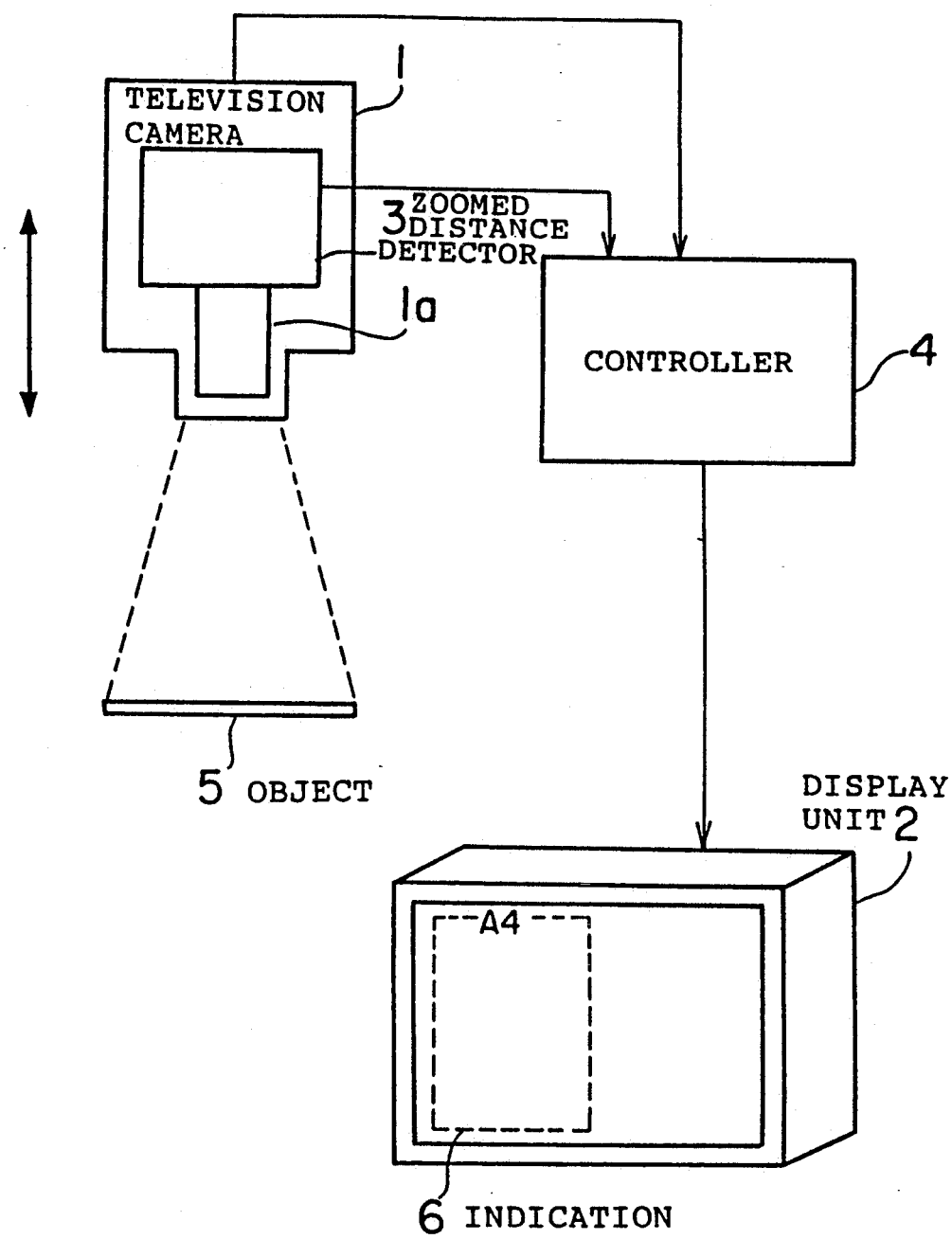
FIG. 1 is a block diagram, partly in perspective, of an apparatus for focusing an image in a television camera for video telephone according to the present invention

FIG. 1 schematically shows an apparatus for focusing an image in a television camera for video telephone according to a first embodiment of the present invention. The image focusing apparatus generally comprises a television camera 1, a display unit 2 for displaying an image produced by the television camera 1, a zoomed distance detector 3 for detecting a zoomed distance, i.e., a distance by which the lens of the television camera 1 is zoomed, and a controller 4.

The television camera 1 has a zooming device 1a for zooming the lens, the zooming device 1a being marked with indicia at a plurality of predetermined discrete positions to which the lens can be zoomed. These positions (hereinafter also referred to as "lens positions") to which the lens can be zoomed are determined as follows: First, the screen of the display unit 2 is marked with an indication corresponding to the size and position where an A4-size sheet of paper is to be displayed on the screen. The size of the marked indication is selected to cover a substantial area of the screen of the display unit 2 so that any graphic patterns and characters on the sheet can easily be perceived on the display unit 2. Then, the A4-size sheet is imaged by the television camera 1. While the produced image of the A4-size sheet is being displayed on the screen of the display unit 2, the position of the television camera 1 is varied or the zooming device 1a is operated on to find a lens position in which the displayed image is sharply focused and the edges of the displayed A4-size sheet are aligned with the marked indication on the screen. The lens position thus determined corresponds to one of the positions indicated by the indicia marked on the zooming device 1a. The indicia corresponding to the determined lens position is indicated by "A4". With respect to other sheet sizes, respective lens positions are determined in the same procedure as described above, and the corresponding positions on the lens device 1 are indicated by the respective indicia.

The controller 4 includes a memory which stores, as a table, the sizes of the sheets corresponding to the indicia and the sizes and positions of the indications to be displayed on the screen of the display unit 2, in association with signals that are transmitted from the zoomed distance detector 3 as representing the respective lens positions.

It is assumed that the television camera 1 is to be focused on object 5, e.g., an A4-size sheet. First, the zooming device 1a is operated on to align a pointer with the indicia "A4" on the zooming device 1a. The zooming device 1a immediately outputs an signal indicative of the corresponding lens position to the controller 4. In response to the signal from the zooming device 1a, the controller 4 reads, from the memory, the corresponding sheet size and the corresponding size and position of the indication to be displayed on the screen, and displays an indication 6 on the display unit 2. The user, i.e., the speaker, then moves the television camera 1 with respect to the object 5 until the edges of the object 5 are aligned with the indication 6 on the screen. When the edges of the object 5 are aligned with the indication 6, the lens of the television camera 1 is properly focused on the object 5.

A video telephone set, including the focusing apparatus according to the present invention, will be described in detail with reference to FIG. 2.

Figure 2:
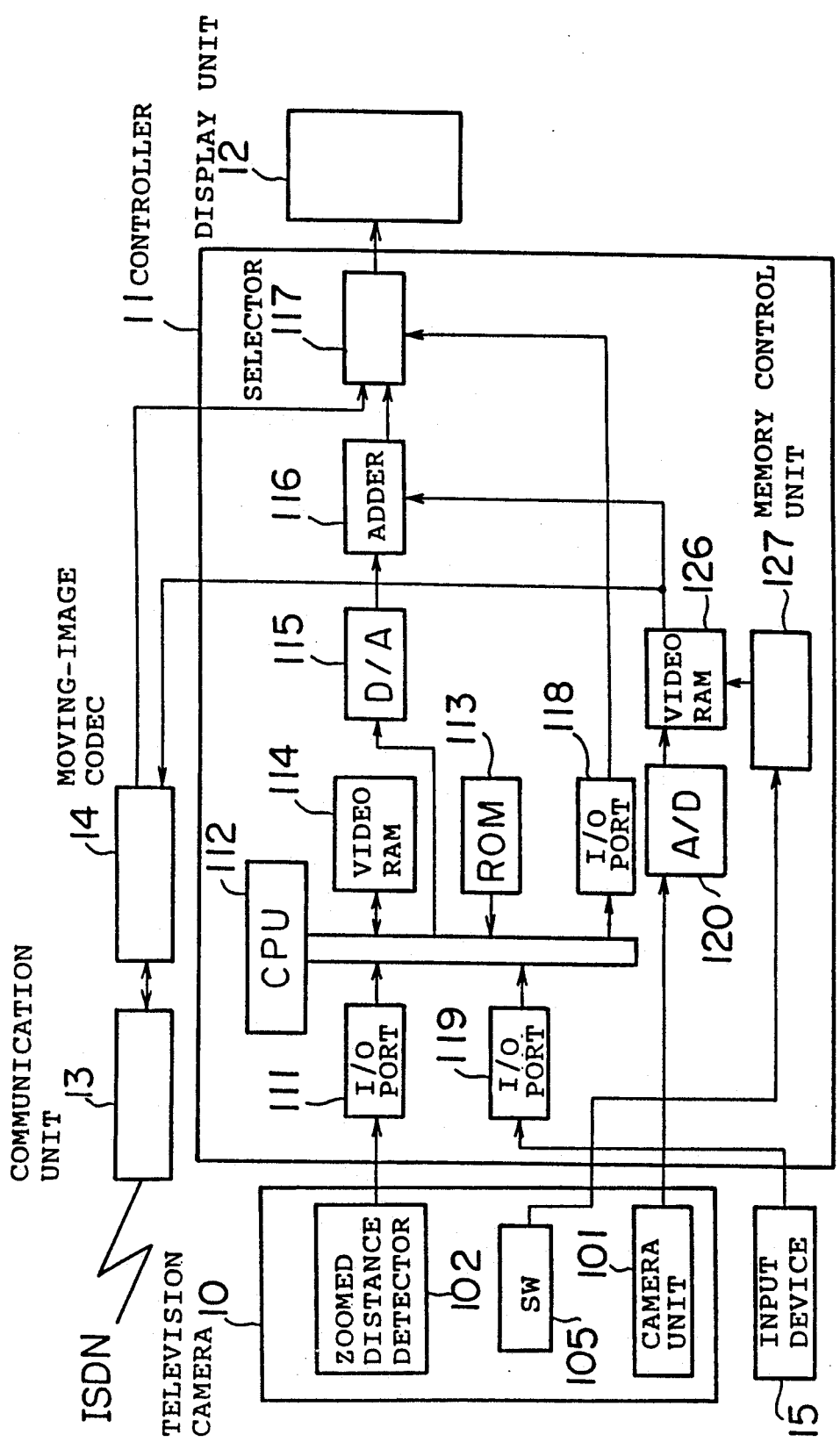
FIG. 2 is a block diagram of a video telephone set including the image focusing apparatus shown in FIG. 1.

As shown in FIG. 2, a television camera 10, which corresponds to the television camera 1 shown in FIG. 1, comprises a camera unit 101 for imaging an object and converting an optical signal indicative of the imaged object into an electric video signal, and a zoomed distance detector 102, corresponding to the zoomed distance detector 3 shown in FIG. 1, for detecting a lens position. The zoomed distance detector 102 includes a potentiometer, for example, for detecting a lens position to which the lens barrel is moved, and converts the lens position signal into a digital signal. The digital lens position signal from the zoomed distance detector 102 is supplied through an I/O port 111 to a CPU 112 in a controller 11. As described later on with reference to FIG. 3, the lens barrel of the television camera 10 incorporates a zooming device for zooming the lens, and the zooming device is marked with indicia at a plurality of lens positions, respectively.

According to a program stored in a ROM 113 and based on a table stored therein, the CPU 112 determines the size of a sheet to be displayed on a display unit 12, which corresponds to the display unit 2 shown in FIG. 1, and the size and position of a corresponding indication to be displayed on the display unit 12, in response to the lens position signal from the zoomed distance detector 102, and stores the determined sheet size and the determined size and position of the indication in a video RAM 114. The table stored in the ROM 113 is composed of the sizes of the sheets corresponding to the indicia marked on the zooming device and the sizes and positions of the indications to be displayed on the screen of the display unit 12, in association with indications that are transmitted from the zoomed distance detector 102 as representing the respective lens positions. These stored data are experimentally determined in the manner described above with reference to FIG. 1.

In this embodiment, the object that is displayed is assumed to be a document as a sheet of paper which may be presented in a meeting of people at distant places which is set up using video telephone. The indications marked on the screen of the display unit 12 are therefore frames corresponding to the sizes of sheets of paper, and the indicia on the lens barrel represent the sizes of the sheets of paper.

Figure 3:
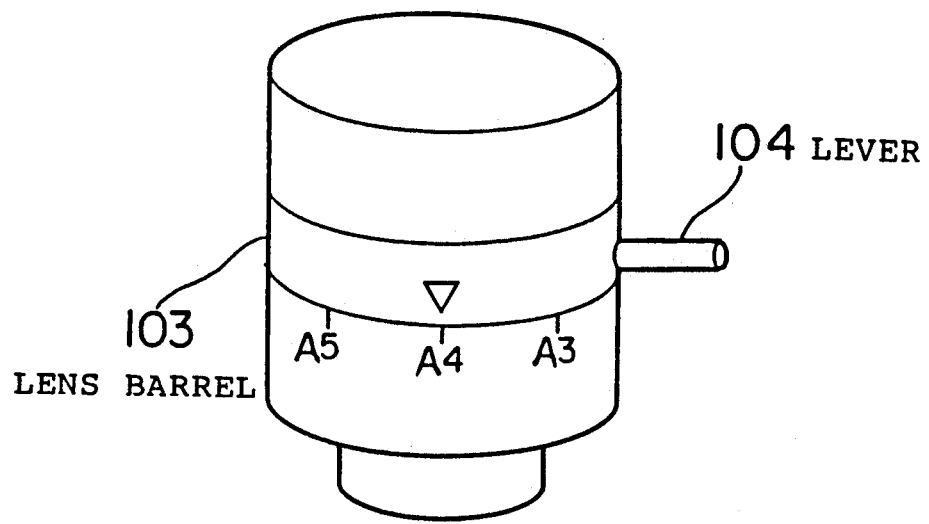
FIG. 3 is a perspective view of a lens barrel of the television camera shown in FIG. 1.

FIG. 3 shows the lens barrel in perspective. The lens barrel, indicated at 103, can be rotated about its own axis by a lever 104 for varying the distance by which the lens is zoomed, i.e., for zooming the lens. The lens barrel 103 has a triangular pointer mark on a rotatable component on which the lever 104 is mounted. The lens barrel 103 also has a nonrotatable component adjacent to the rotatable component, the nonrotatable component being marked with indicia "A5", "A4", and "A3", for example. At the lens positions corresponding to these indicia, the television camera 10 is focused on A5-, A4-, and A3-size sheets, respectively, and the images of the these sheets cover substantial areas of the screen of the display unit 12. When the lens barrel 103 is turned with the lever 104 to align the pointer mark with the indicia "A4", for example, the distance by which the lens has been zoomed is detected by the zoomed distance detector 102, and the detected lens position signal is supplied through the I/O port 111 to the CPU 112.

As shown in FIG. 2, in response to lens position signal from the zoomed distance detector 102, the CPU 112 reads the data of the corresponding indication from the ROM 113 and stores the data in the video RAM 114. Based on the stored data, indication marks 122, 123 are displayed on the display screen, indicated at 121, of the display unit 12.

The data stored in the video RAM 114 is read and sent through a D/A converter 115 to an adder 116, which is also supplied with the document image from the television camera 101 through an A/D converter 120 and a video RAM 126. Therefore, the adder 116 combines the indication and the document image into a combined signal, which is transmitted to a selector 117. A memory control unit 127 is connected to the video RAM 126, which stores an output signal from the A/D converter 120 each time a clock pulse is inputted from the memory control unit 127. The video RAM 126 outputs the stored data at all times. To the memory control unit 127, there is connected a switch 105 of the television camera 10 for producing an signal that is applied to the memory control unit 127 to control the application of clock pulses to the video RAM 126.

The selector 117 is supplied with a video signal from the other party, to which the video telephone set is connected, through an ISDN line, a communication unit 13, and a moving-image CODEC 14. The selector 117 selects one or both of the video signal from the other party and the combined signal according to a selection signal that is supplied from the CPU 112 through an I/O port 118. The selector 117 transmits the selected indication or signals to the display unit 12. When both of the signals are selected, the image represented by one of the signals is set in the image represented by the other signal. The selection signal is outputted by the CPU 112 based on a command signal that is applied to the CPU 112 from a switch (not shown) or an input device 15 such as a keyboard, a mouse, or the like connected to the CPU 112 through an I/O port 119. When the image of a document is to be focused in preparation for the transmission of the image to the other party, the image of the indication and the document, represented by the combined signal from the adder 116, should be displayed on the display unit 12.

The image signal stored in the video RAM 126 is transmitted to the other party through the moving-image CODEC 14, the communication unit 13, and the ISDN line.

A detailed procedure for focusing an imaged document in the video television set will be described below with reference to FIGS. 2, 3, 4(a), 4(b), and 5.

If the document is of a size A4, then the user of the video telephone set, or the speaker, aligns the pointer on the lens barrel 103 with the indicia "A4", detaches the television camera 10 from the video telephone set, holds the television camera 10 by hand, and directs the television camera 10 toward the document. During this time, the zoomed distance detector 102 outputs a lens position signal corresponding to the indicia "A4", and the controller 11 responds to the lens position signal to determine a frame (indication mark) 122 and display the frame 122 on the display unit 12. At this time, the indication mark 123 representing "A4" is also displayed on the display unit 12 (see FIG. 4(a)). The speaker then moves the television camera 10 with respect to the document until a displayed document image 124 (see FIG. 5(a)) is aligned with the frame 122 on the display screen 121 of the display unit 12. If the document image 124 is not in alignment with the frame 122, then since the television camera 10 is out of focus, the document image 124 on the display unit 12 cannot be clearly viewed. However, the user can determine whether the document image 124 is larger or smaller than the frame 122. Immediately before the document image 124 is aligned with the frame 122, the user can easily make the above determination as the document image 124 is focused considerably sharply. When the document image 124 is aligned with the frame 122, the user turns on the switch 103 on the television camera 10, causing the memory control unit 127 to stop the application of clock pulses to the video RAM 121. The signal stored in the video RAM 121 is no longer updated, and the video RAM 121 outputs only the document image that is in focus. Thereafter, the video RAM 126 keeps transmitting the sharply focused document image to the other party irrespective of the position of the television camera 10 with respect to the document being imaged.

Figure 6A:
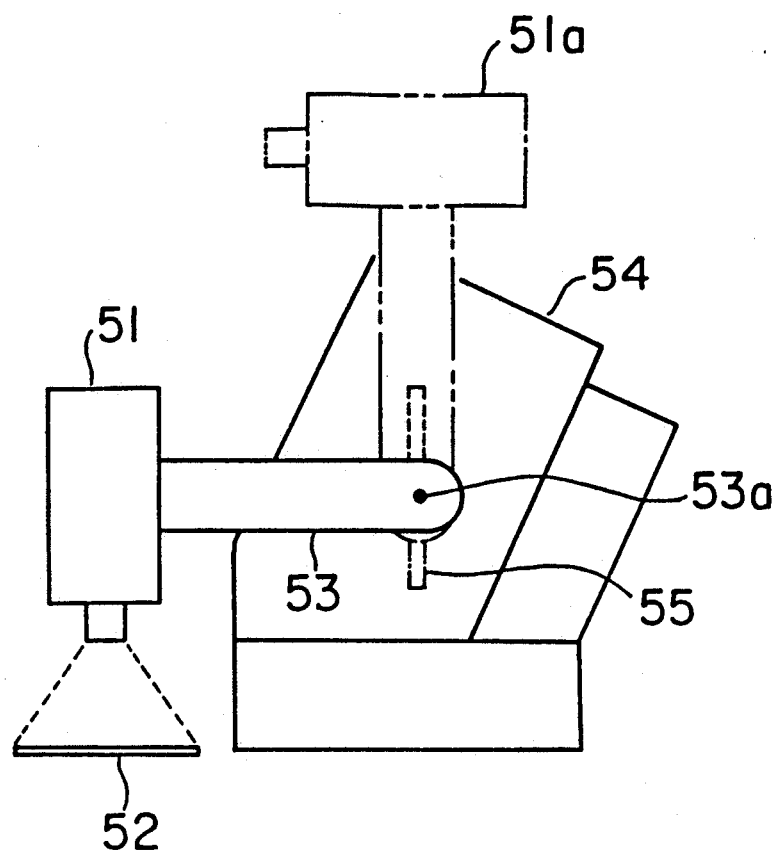
FIG. 6(a) is a side elevational view of a video television set with a camera holder.

In the above embodiment, the user or speaker adjusts the relative position between the document and the television camera 10 white holding the television camera 10 by hand. However, as shown in FIG. 6(a), a video telephone set 54 may have a camera holder 53 for holding a television camera 51 stably with respect to a document 52. The camera holder 53, which supports the television camera 51 on its distal end, is rotatable about a shaft 53 on the video telephone set 54. The camera holder 53 is also vertically movable along a guide groove 55 defined in the video telephone set 54. While the television camera 51 is imaging the speaker, the television camera 51 is held in a position 51a indicated by the two-dot-and-dash lines. When the television camera 51 is to image the document 52 which may be placed on a desk or the like, the camera holder 53 is turned about the shaft 53a to bring the television camera 51 into a position indicated by the solid lines, and is vertically moved along the guide groove 55 to adjust the distance between the television camera 51 and the document 52.

Figure 6B:
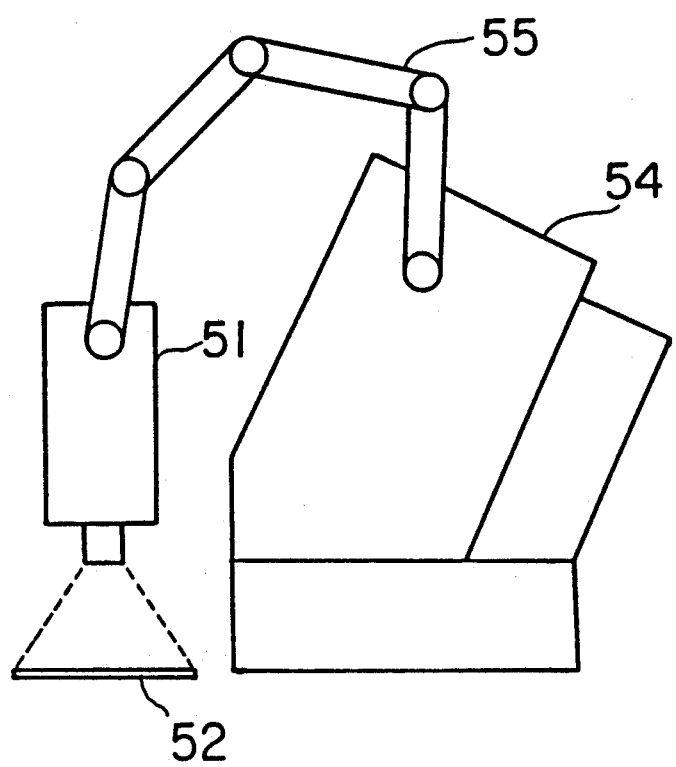
FIG. 6(b) is a side elevational view of a video television set with an articulated arm as a camera holder.

Alternatively, as shown in FIG. 6(b), an articulated arm 55 composed of a multiple of angularly movably joined arm members may be used as a camera holder. The television camera 51 is mounted on a distal end of the articulated arm 55 which is pivotally coupled to the other nd to the video telephone set 54. Since the articulated arm 55 allows the television camera 51 to selectively image the speaker and the document 52.

With the camera holders shown in FIGS. 6(a) and 6(b) being used, since the image produced by the television camera 10 is not brought out of focus after it has been focused, the various circuit components for storing still images shown in FIG. 2, i.e., the switch 105, the memory control unit 127, the A/D converter 120, and the video RAM 121 may be dispensed with. In the case where these circuit components are dispensed with, the output signal from the television camera unit 101 is directly supplied to the moving-image CODEC 14 and the adder 116.

A command signal may be applied from the input device 15 to the CPU 112 to vary the orientation and position of the frame 122 on the display screen of the display unit 12. Such a modification makes the video telephone flexible enough to meet demands for various applications.

Figure 7:
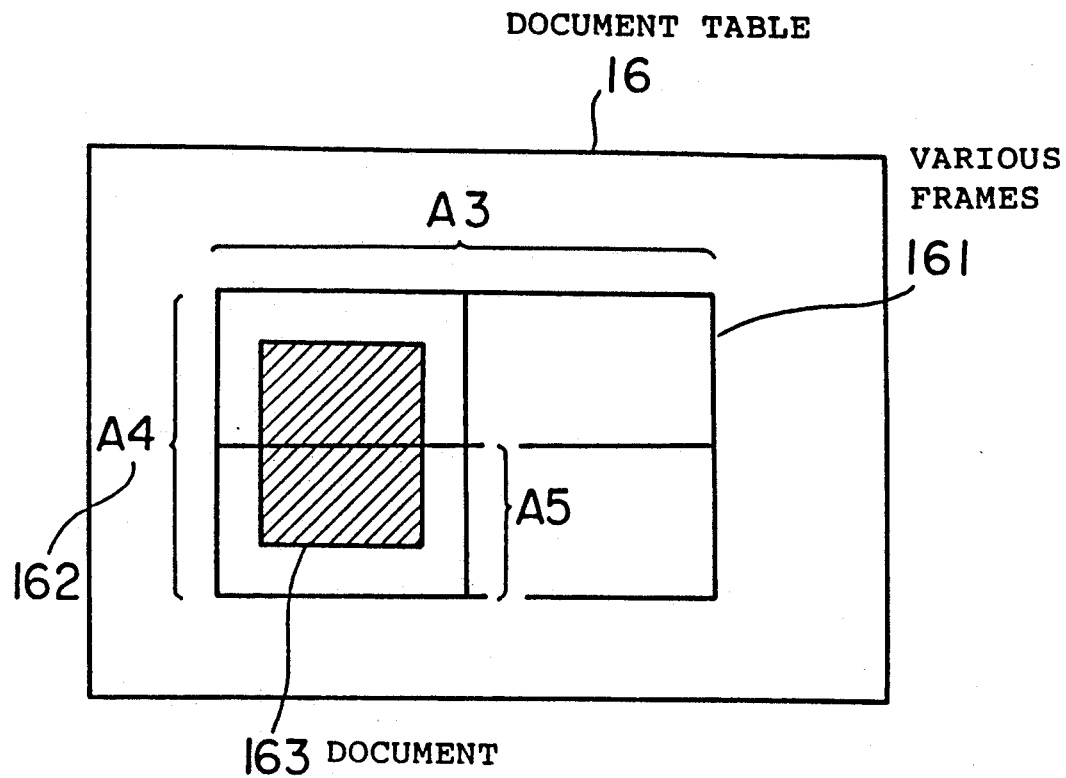
FIG. 7 is a plan view of a document table.

If documents to be imaged are not of a fixed size, then a document table 16 as shown in FIG. 7 may be employed. Specifically, the document table 16 bears various frames 161 corresponding to different sheet sizes A3, A4, A5, etc., and indication marks 162 indicative of the different frames 161. A document 163 of an unfixed size to be imaged is placed on the document table 16, and the image of the frame 161 which is immediately larger than the document size and which corresponds to the size indicated by the pointer on the lens barrel 103 is brought into alignment with the indication on the display screen.

Figure 4A:
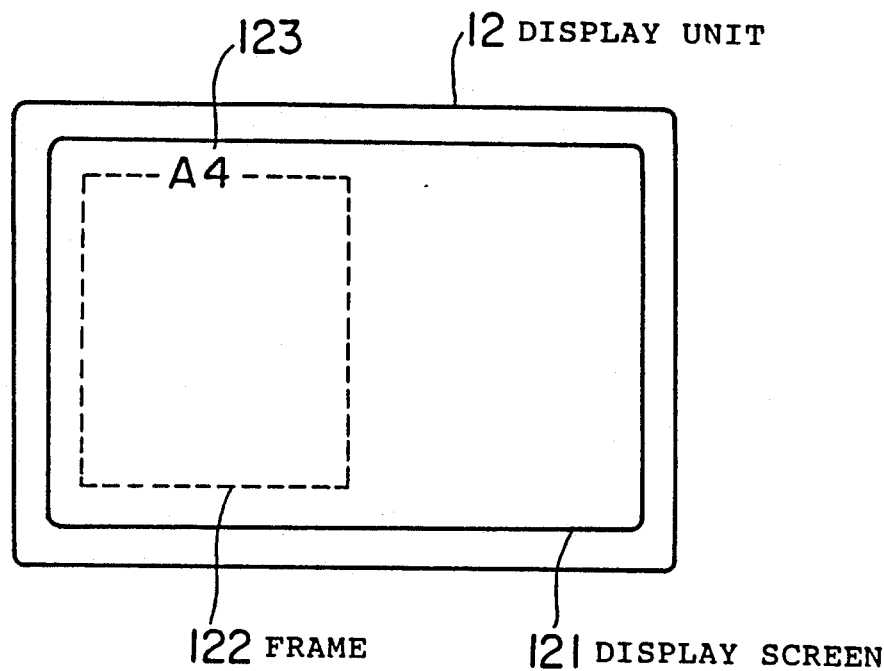
FIG. 4(a) is a view showing a display unit.
Figure 4B:
FIG. 4(b) is a view showing a mark.
Figure 5:
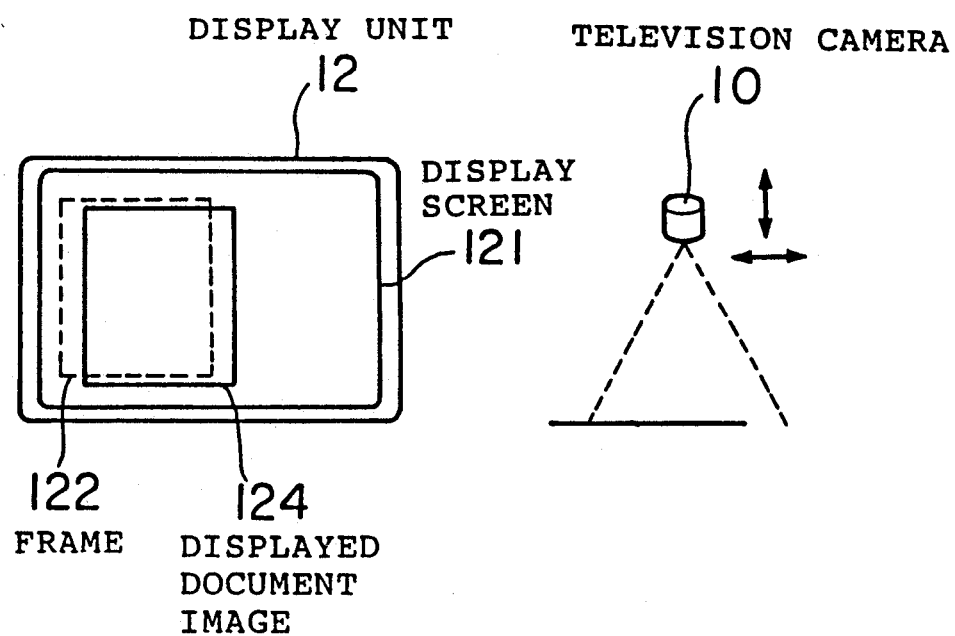
FIG. 5 is a view showing the manner in which a displayed image is focused.

The indication marks displayed on the display unit 12 may be indication marks 125 which correspond to the length of one side of a sheet, as shown in FIG. 4(b). The indication marks 125 are accurate and reliable enough to ensure alignment between themselves and the document image.

The object to be imaged may not necessarily be a document or sheet of certain size, but may be an article or similar object, and the lens barrel 103 may be marked with indicia "5 cm", "10 cm", "15 cm", "20 cm", etc., and the display screen with indications corresponding to these lengths. With the object to be imaged being marked with the corresponding lengths, the marks on the object and the indications on the display screen can be brought into alignment with each other.

A second embodiment of the present invention will be described below.

In the first embodiment, the sizes of objects to be displayed are marked on the lens barrel 103. According to the second embodiment, the lens barrel is not marked with indicia indicative of the sizes of objects to be imaged, but is movable to any one of continuous lens positions and the size of an object to be imaged is inputted from the input device to the controller.

More specifically, the video telephone set according to the second embodiment is basically the same as the video telephone set according to the first embodiment, but the ROM in the controller stores different data from those stored in the ROM in the controller according to the first embodiment. The ROM according to the second embodiment stores a table of the sizes of indications to be displayed on the display unit, and one of the stored sizes can be determined based on the distance to which the lens barrel has been zoomed and the size of a sheet inputted from the input device. The table is produced from experimentally determined data. The indications are represented by marks indicative of the edges of sheets on the display screen of the display unit, as with the first embodiment.

Based on the inputted sheet size and the lens position detected by the zoomed distance detector, the CPU determines, from the table, the size of an indication to be displayed on the display unit, and displays the frame corresponding to the determined size on the display unit. The speaker varies the position of the television camera until the displayed sheet aligns with the displayed frame, thereby imaged sheet into focus.

With the second embodiment, the size of a sheet to be displayed can easily be inputted from the input device and the distance to which the lens barrel is zoomed can continuously be varied. Therefore, the size of the indication displayed on the display unit can freely be changed to any dimension. Accordingly, the video telephone set according to the second embodiment can be manipulated with ease to focus the images of differently sized sheets.

Alternatively, the CPU may be arranged to be able to calculate the size of an indication to be displayed on the display unit from the distance to which the lens barrel is zoomed and the size of a sheet inputted from the input device, based on a predetermined function stored in the ROM.

As with the first embodiment, furthermore, the indication marks displayed on the display unit may be indication marks which correspond to the length of one side of a sheet. Still images may be produced by the television camera, or one of the camera holders shown in FIGS. 6(a) and 6(b) may be employed. Objects to be displayed may not be limited to sheets of certain sizes, but may be any desired articles or similar objects, and the lengths of portions of such articles or similar objects may be measured and inputted through the input device to the CPU. The CPU may determine an indication having a length on the display unit which corresponds to the inputted length, and display the determined indication on the display unit. This modification allows the video television set to focus the image efficiently as the article or object to be imaged may not be of any particular size.

Although certain preferred embodiments of the present invention have been shown and described in detail, it should be understood that various changes and modifications may be made therein without departing from the scope of the appended claims.

What is claimed is:

1. A method of focusing an image for a video telephone set having a television camera for imaging an object, the television camera being variable in distance up to the object, a display unit for displaying the image of the object imaged by the television camera, and zoomed distance detecting means for detecting the distance to which the lens of the television camera is zoomed, said method comprising the steps of:
    (a) detecting the distance to which the lens of the television camera is zoomed, with the zoomed distance detecting means;

(b) determining an indication corresponding to a predetermined portion of the object, based on the detected distance;

(c) displaying the determined indication together with the image of the object imaged by the television camera on the display unit; and (d) transmitting the image of the object as a focused image to another video telephone set when said predetermined portion of the object is aligned with said indication on the display unit as a result of movement of the television camera with respect to the object.

2. A method according to claim 1, wherein said step (d) comprises the steps of:

(d1) storing the image of the object when said predetermined portion of the object is aligned with said indication on the display unit as a result of movement of the television camera with respect to the object; and (d2) transmitting the stored image of the object as the focused image to the other video telephone set.

3. A method according to claim 1, wherein said predetermined portion of the object comprises a sheet of a predetermined size, said indication which is displayed on the display unit comprising a frame corresponding to the sheet of the predetermined size.

4. A method according to claim 1, wherein said indication has a size corresponding to the length of said predetermined portion of the object, said indication which is displayed on the display unit comprising a mark having a length indicative of the actual length of said predetermined portion of the object.

5. A method of focusing an image for a video telephone set having a television camera for imaging an object, the television camera being variable in distance up to the object, a display unit for displaying the image of the object imaged by the television camera, zoomed distance detecting means for detecting the distance to which the lens of the television camera is zoomed, and an input device for inputting the size of the object, said method comprising the steps of:

(a) reading the distance to which the lens of the television camera is zoomed, from the zoomed distance detecting means;

(b) reading the size of the object from the input device;

(c) determining the size of an indication corresponding to a predetermined portion of the object, based on the read distance and the read size of the object;

(d) displaying the determined indication together with the image of the object imaged by the television camera on the display unit; and (e) transmitting the image of the object as a focused image to another video telephone set when said predetermined portion of the object is aligned with said indication on the display unit as a result of movement of the television camera with respect to the object.

6. A method according to claim 5, wherein said step (e) comprises the steps of:

(e1) storing the image of the object when said predetermined portion of the object is aligned with said indication on the display unit as a result of movement of the television camera with respect to the object; and (e2) transmitting the stored image of the object as the focused image to the other video telephone set.

7. A method according to claim 5, wherein said predetermined portion of the object comprises a sheet of a predetermined size, said indication which is displayed on the display unit comprising a frame corresponding to the sheet of the predetermined size.

8. A method according to claim 5, wherein said indication has a size corresponding to the length of said predetermined portion of the object, said indication which is displayed on the display unit comprising a mark having a length indicative of the actual length of said predetermined portion of the object.

9. An apparatus for focusing an image for a video telephone set, comprising:

a television camera for imaging an object, said television camera having a lens;

a display unit for displaying the image of the object imaged by said television camera;

zooming means for varying the distance to which the lens of the television camera is zoomed;

zoomed distance detecting means for detecting the distance to which the lens of the television camera is zoomed by said zooming means;

control means for determining an indication corresponding to a predetermined portion of the object, based on said detected distance, and displaying the determined indication on the display unit; and transmitting means for transmitting the image of the object as a focused image to another video telephone set when said predetermined portion of the object is aligned with said indication on the display unit as a result of movement of the television camera with respect to the object.

10. An apparatus according to claim 9, wherein said zooming means comprising means for zooming the lens to one of a plurality of predetermined discrete lens positions at a time, said zooming means being marked with respective indicia at said lens positions, one of said indicia corresponding to the size of said predetermined portion of the object.

11. An apparatus according to claim 10, wherein said control means comprises a memory for storing data of a plurality of indications corresponding to discrete distances to which the lens is movable, and means for determining an indication from the data stored in said memory based on the distance detected by said zoomed distance detecting means, and displaying the determined indication on said display unit.

12. An apparatus according to claim 9, further including an input device for inputting the size of the object, said control means comprising means for determining the size of said indication based on the distance detected by said zoomed distance detecting means and the size of the object inputted from said input device, and displaying said indication with the size thereof determined on said display unit.

13. An apparatus according to claim 12, wherein said control means comprises a memory for storing data of continuous distances to which the lens is movable and data of the sizes of indications corresponding to the sizes of a plurality of objects, and means for determining an indication from the data stored in said memory based on the distance detected by said zoomed distance detecting means and the size of the object inputted from said input device, and displaying the determined indication with the size thereof determined on said display unit.

14. An apparatus according to claim 12, wherein said control means comprises a memory for storing a predetermined function, and means for calculating the size of an indication according to the stored predetermined function based on the distance detected by said zoomed distance detecting means and the size of the object inputted from said input device, and displaying the determined indication with the size thereof determined on said display unit.

15. An apparatus according to claim 9, further including memory means for storing the image of the object when said predetermined portion of the object is aligned with said indication on the display unit as a result of movement of the television camera with respect to the object, said transmitting means comprising means for transmitting the stored image of the object as the focused image to the other video telephone set.

16. An apparatus according to claim 9, further including camera holding means for moving and holding said television camera with respect to the object at a selected position.

17. An apparatus according to claim 9, wherein said control means comprises a memory for storing data of a plurality of indications corresponding to continuous distances to which the lens is movable, and means for determining an indication from the data stored in said memory based on the distance detected by said zoomed distance detecting means, and displaying the determined indication on said display unit.

18. An apparatus according to claim 9, wherein said predetermined portion of the object comprises a sheet of a predetermined size, said indication which is displayed on the display unit comprising a frame corresponding to the sheet of the predetermined size.

19. An apparatus according to claim 9, where in said indication has a size corresponding to the length of said predetermined portion of the object, said indication which is displayed on the display unit comprising a mark having a length indicative of the actual length of said predetermined portion of the object.

20. An apparatus according to claim 9, further including an articulated arm coupled to said television camera for adjusting the position of the television camera with respect to the object.

* * * * *